United States Patent
Consalo et al.

(10) Patent No.: US 10,899,639 B2
(45) Date of Patent: Jan. 26, 2021

(54) COMPOSITION AND METHOD FOR INHIBITING MICROBIAL ADHESION ON SURFACES

(71) Applicant: SOLENIS TECHNOLOGIES, L.P., Wilmington, DE (US)

(72) Inventors: Corinne E. Consalo, Wilmington, DE (US); William Carey, Wallingford, PA (US)

(73) Assignee: SOLENIS TECHNOLOGIES, L.P., Wilmington, DE (US)

(*) Notice: Subject to any disclaimer, the term of this patent is extended or adjusted under 35 U.S.C. 154(b) by 0 days.

(21) Appl. No.: 16/150,950

(22) Filed: Oct. 3, 2018

(65) Prior Publication Data

US 2019/0100447 A1 Apr. 4, 2019

Related U.S. Application Data

(60) Provisional application No. 62/567,616, filed on Oct. 3, 2017.

(51) Int. Cl.
| | |
|---|---|
| *C02F 1/50* | (2006.01) |
| *A01N 25/30* | (2006.01) |
| *A01N 41/04* | (2006.01) |
| *C02F 103/00* | (2006.01) |
| *C02F 103/28* | (2006.01) |
| *C02F 103/02* | (2006.01) |

(52) U.S. Cl.
CPC ............ *C02F 1/50* (2013.01); *A01N 25/30* (2013.01); *A01N 41/04* (2013.01); *C02F 2103/007* (2013.01); *C02F 2103/023* (2013.01); *C02F 2103/28* (2013.01); *C02F 2303/20* (2013.01); *C02F 2305/04* (2013.01)

(58) Field of Classification Search
CPC .. C02F 1/50; C02F 2103/023; C02F 2303/20; C02F 2103/28; C02F 2103/007; C02F 2305/04; A01N 41/04; A01N 25/30
See application file for complete search history.

(56) References Cited

U.S. PATENT DOCUMENTS

| | | |
|---|---|---|
| 5,670,055 A | 9/1997 | Yu et al. |
| 6,020,293 A | 2/2000 | Ahmed et al. |
| 6,521,587 B1 | 2/2003 | L'Hostis et al. |
| 2003/0087786 A1 | 5/2003 | Hei et al. |

OTHER PUBLICATIONS

ISA/US, International Search Report and Written Opinion issued in Int. Appl. No. PCT/US2018/054185, dated Jan. 8, 2019.

*Primary Examiner* — Aradhana Sasan
*Assistant Examiner* — Quanglong N Truong
(74) *Attorney, Agent, or Firm* — Lorenz & Kopf, LLP

(57) ABSTRACT

A composition includes a surfactant that is a linear alkylbenzene sulfonate, an acid thereof, or a combination thereof and that is present in an amount of from about 5 to about 30 weight percent actives based on a total weight of the composition and has the structure:

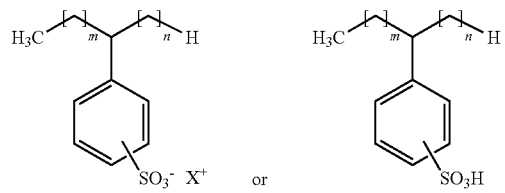

wherein each m is independently a number of from 0 to 16, each n is independently a number of from 0 to 16, the sum of each m+n is a number of from 4 to 16, and X is a counter ion. The composition also includes a defoamer in an amount of from about 1 to about 20 weight percent actives based on a total weight of the composition, a thickening agent in an amount of from greater than zero to an amount of about 3 weight percent actives based on a total weight of the composition, and water.

20 Claims, No Drawings

COMPOSITION AND METHOD FOR INHIBITING MICROBIAL ADHESION ON SURFACES

CROSS-REFERENCE TO RELATED APPLICATIONS

This application claims priority to application Ser. No. 62/567,616, filed on Oct. 3, 2017, which is hereby incorporated in its entirety by reference.

FIELD OF THE DISCLOSURE

The present disclosure generally relates to a composition and a method for inhibiting microbial adhesion on surfaces in contact with an aqueous system. More specifically, this disclosure relates to a composition that includes a linear alkylbenzene sulfonate, a defoamer, and a thickening agent and a method that contacts the composition with an aqueous system, such as a cooling tower.

BACKGROUND

Microbiological fouling has always been problematic in industrial water systems, such as cooling towers, heat exchangers, airwashers, and in pulp and paper manufacturing systems. However, microbiological fouling may be present and cause problems in any aqueous containing system.

Microbiological fouling may result from the presence of any of a variety of organisms in an aqueous system. Among the organisms that tend to be important in microbiological fouling are a variety of algae, fungus, mold, and a variety of planktonic bacterial organisms. Such organisms may be introduced to aqueous industrial systems and intake water used in the system, from the environment, such as from the air, or from other process in leakage contamination sources, which could include, for example, an input of a component of foreign composition into the system or the introduction of contaminated equipment into a system. Bacteria form a major component of microbiological fouling in aqueous systems. Bacteria can grow in almost any environment.

The presence of microorganisms in industrial water cannot be totally eliminated even with excessive use of chemical biocides. Formation of bacteria biofilms can adversely affect heat transfer efficiency and fluid friction resistance. In addition, biofouling also plays an important role in microbiologically influenced corrosion.

The most common means to control biofouling is using chemicals such as chlorine, bromine, isothiazolone, glutaraldehyde and other biocides. These chemical biocides serve to kill the planktonic and attached microorganisms. However, it appears that biocides have difficulty penetrating the extracellular polymeric material in biofilms and removing them from the surface. Excessive dosage of biocide might be able to control the biofouling; however, its presence in the effluent is environmentally unacceptable.

The use of surfactants to remove or prevent the formation of biofilm in industrial aqueous systems is known. For example Yu et al. in U.S. Pat. No. 5,670,055 discloses a method for dispersing biofilms on surfaces of an industrial process water system comprising treating the water with an effective dispersing amount of linear alkylbenzene sulfonate. However, it is known that linear alkylbenzene sulfonate exhibits extensive foaming such that it is difficult to use in many circumstances.

Excessive foaming in industrial aqueous systems, such pulp and paper manufacturing systems, and cooling water systems, can adversely affect their operation and/or be considered an EH&S risk. When excessive foaming is encountered in such situations it is common practice to feed an anti-foaming agent separately to the aqueous system. This, however, complicates treatment schemes by requiring separate feed systems for the anti-foaming agents and the potential to still feed other components alone if the anti-foaming agent feed system malfunctions. Additionally, given the surface active nature of many surfactants, such as linear alkylbenzene sulfonate, and the chemical nature of some classes of anti-foaming agents, the possibility exists that combining the two compounds an adversely impact the efficacy of the surfactant such that the treatment fails.

Accordingly, it is desirable to develop an improved composition and method for minimizing microbiological fouling. Furthermore, other desirable features and characteristics of the present disclosure will become apparent from the subsequent detailed description of the disclosure and the appended claims, taken in conjunction with this background of the disclosure.

BRIEF SUMMARY

This disclosure provides a composition for inhibiting microbial adhesion on surfaces, e.g. surfaces of an aqueous system. The composition includes a surfactant that is a linear alkylbenzene sulfonate, an acid thereof, or a combination thereof and that is present in an amount of from about 5 to about 30 weight percent actives based on a total weight of the composition and has the structure:

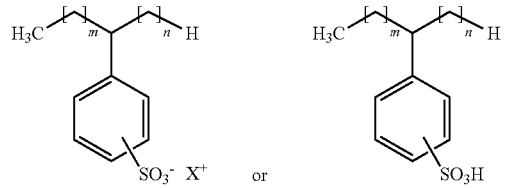

wherein each m is independently a number of from 0 to 16, each n is independently a number of from 0 to 16, the sum of each m+n is a number of from 4 to 16, and X is a counter ion. The composition also includes a defoamer present in an amount of from about 1 to about 20 weight percent actives based on a total weight of the composition. The composition further includes a thickening agent present in an amount of from greater than zero to an amount of about 3 weight percent actives based on a total weight of the composition and also includes water.

This disclosure also provides a method for inhibiting microbial adhesion on surfaces in contact with water in an aqueous system. The method includes the steps of providing the aforementioned composition and combining the composition and the water in the aqueous system to inhibit microbial adhesion on surfaces of the aqueous system.

DETAILED DESCRIPTION

The following detailed description is merely exemplary in nature and is not intended to limit the instant composition or method. Furthermore, there is no intention to be bound by any theory presented in the preceding background or the following detailed description.

Embodiments of the present disclosure are generally directed to compositions for inhibiting microbial adhesion on surfaces in aqueous systems and methods for forming and utilizing the same. For the sake of brevity, conventional techniques related to such compositions and methods may not be described in detail herein. Moreover, the various tasks and process steps described herein may be incorporated into a more comprehensive procedure or process having additional steps or functionality not described in detail herein. In particular, various steps in the manufacture of certain components utilized herein are well-known and so, in the interest of brevity, many conventional steps will only be mentioned briefly herein or will be omitted entirely without providing the well-known process details.

In various embodiments, this disclosure describes a low foaming composition for inhibiting microbial adhesion on surfaces in contact with an aqueous system. The terminology "low foaming" typically describes a relative standard as would be understood by one of skill in the art. For example, powerplants typically cannot tolerate any foam. Cooling towers or geothermal systems may be able to tolerate a few inches of foam in their process water. Moreover, the terminology "microbial adhesion" typically describes biofilms on the surfaces, as would also be understood by those of skill in the art. Referring now to the surfaces themselves that are in contact with the aqueous system, these surfaces are not particularly limited and may be any known in the art including, but not limited to, pipes, nozzles, condensers, tower components, basins, etc. Furthermore, the aqueous system is also not particularly limited and may be any known in the art including, but not limited to, powerplants, cooling towers, geothermal systems, etc.

The composition itself may be, include, consist essentially of, or consist of, a surfactant, a defoamer, a thickening agent, and water. The terminology "consist essentially of" may describe embodiments that are free of, or that include less than 5, 4, 3, 2, 1, 0.5, 0.1, 0.05, or 0.01, weight percent actives based on a total weight of the composition of, one or more surfactants, acids, bases, biocides, or any one or more optional components or additives described herein. In various non-limiting embodiments, all values and ranges of values including and between those set forth above are hereby expressly contemplated for use herein.

Surfactant

The surfactant may be or include an alkyl aryl sulfonate (such as a linear alkylbenzene sulfonate), an acid thereof, or a combination thereof. The alkyl aryl sulfonate may be any in the art and may be further defined as having any alkyl group such as ethyl (e.g. ethyl aryl sulfonate), propyl (e.g. propyl aryl sulfonate), etc., and combinations thereof. In various embodiments, the alkyl aryl sulfonate is a linear alkylbenzene sulfonate that is present in an amount of from about 5 to about 30 weight percent actives based on a total weight of the composition. In various embodiments, the linear alkylbenzene sulfonate is present in an amount of from about 10 to about 25, about 15 to about 20, about 5 to about 15, about 5 to about 20, about 5 to about 25, about 10 to about 25, about 10 to about 20, about 10 to about 15, about 15 to about 25, about 14 to about 16, about 12 to about 18, or about 5, 6, 7, 8, 9, 10, 11, 12, 13, 14, 15, 16, 17, 18, 19, 20, 21, 22, 23, 24, 25, 26, 27, 28, 29, or 30, weight percent actives based on a total weight of the composition. In various non-limiting embodiments, all values and ranges of values including and between those set forth above are hereby expressly contemplated for use herein.

In various embodiments, the surfactant is a linear alkylbenzene sulfonate, an acid thereof, or a combination thereof. The linear alkylbenzene sulfonate (LAS) or acid thereof has the following structure:

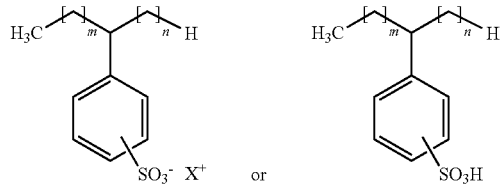

wherein each m is independently a number of from 0 to 16, each n is independently a number of from 0 to 16, the sum of each m+n is a number of from 4 to 16, and X is a counter ion. Each of the variables (m) and (n) may be the same or may be different from each other. In various embodiments, each of m and/or n is independently 0, 1, 2, 3, 4, 5, 6, 7, 8, 9, 10, 11, 12, 13, 14, 15, or 16, so long as the sum of m+n is a number of from 4 to 16, e.g. 4, 5, 6, 7, 8, 9, 10, 11, 12, 13, 14, 15, or 16. Relative to the counter ion, the counter ion may be any ion that has a +1 charge, such as any organic or inorganic counter ion. In various embodiments, the counter ion is $Na^+$ or $K^+$. In one embodiment, m+n=8 to 10 and X is $Na^+$. Linear alkylbenzene sulfonate is commercially available from a number of suppliers including Stephan Company of Northfield Ill. and TCI America of Portland Oreg. Combinations of two or more independent alkyl aryl sulfonates may also be used herein. In one embodiment, the surfactant is or includes dodecylbenzene sulfonate, dodecylbenzene sulfonic acid, and/or combinations thereof. In various non-limiting embodiments, all values and ranges of values including and between those set forth above are hereby expressly contemplated for use herein.

Defoamer

Referring back, the composition also includes a defoamer. The defoamer is present in an amount of from about 1 to about 20 weight percent actives based on a total weight of the composition. In various embodiments, the defoamer is present in an amount of from about 1 to about 18, about 2 to about 18, about 5 to about 15, about 10 to about 15, about 5 to about 10, about 8 to about 12, about 10 to about 20, or about 1, 2, 3, 4, 5, 6, 7, 8, 9, 10, 11, 12, 13, 14, 15, 16, 17, 18, 19, or 20, weight percent actives based on a total weight of the composition. In various non-limiting embodiments, all values and ranges of values including and between those set forth above are hereby expressly contemplated for use herein.

The defoamer (also known as an anti-foam) is not particularly limited and may be any known in the art. For example, non-limiting examples of the defoamer include fatty acids such as carboxylic acids with long aliphatic chains, which are either saturated or unsaturated, e.g. fatty acids having an unbranched chain of an even number of carbon atoms, such as from 4 to 28 and also alcohols and esters thereof. Other non-limiting examples of the defoamer include silicone based polymers that include or are hydrophobic silica. Still other non-limiting examples are glycols such as polyethers derived from ethylene oxide, propylene oxide, and combinations thereof. Further non-limiting examples includes tri-butyl phosphate, aqueous emulsions including, hydrophobic silica, and combinations of any one or more of the aforementioned options. Aqueous based hydrophobic silica containing defoamers are commercially available from Solenis LLC of Wilmington, Del. under the tradename of Drewplus FG 720.

In one embodiment, the defoamer is an emulsion comprising hydrophobic silica. In another embodiment, the defoamer is chosen from fatty acids, alcohols and esters thereof, hydrophobic silica, glycols, tri-butyl phosphate, and combinations thereof. For example, the glycols may be further defined as polyether derived from ethylene oxide, propylene oxide, and combinations thereof. Alternatively, the defoamer is an aqueous hydrophobic silica. In another embodiment, the defoamer is present in an amount of from about 5 to about 15 weight percent actives based on a total weight of the composition.

Thickening Agent

The composition including the surfactant and the defoamer may be a solution, an emulsion, a dispersion, etc. A thickening agent is typically utilized as well. For example, if an emulsion or dispersion, e.g. when formulated with a hydrophobic silica containing defoamer, a thickening agent is typically used. Alternatively, a thickening agent may be utilized even if the composition is not a dispersion or emulsion.

Referring now to the thickening agent, the thickening agent is present in an amount of from greater than zero to an amount of about 3 weight percent actives based on a total weight of the composition. For example, the thickening agent may be present in any amount so long as that amount is greater than zero but yet not greater than about 3. In other embodiments, the thickening agent is present in an amount of from about 0.5 to about 2.5, about 1.0 to about 2.0, about 1.5 to about 2.0, about 1.0 to about 1.5, about 0.5 to about 1.0, about 0.5 to about 2.0, about 2.5 to about 3.0, about 1.0 to about 1.25, about 1.25 to about 1.50, about 1.25 to about 1.75, about 1.5 to about 1.75, about 1.75 to about 2.0, weight percent actives based on a total weight of the composition. In various non-limiting embodiments, all values and ranges of values including and between those set forth above are hereby expressly contemplated for use herein.

The thickening agent is not particularly limited and may be any known in the art. In various embodiments, the thickening agent is chosen from modified cellulosics such as hydroxyethyl cellulose, and modified polyacrylates such as alkali soluble emulsions (ASE), cross-linked polyacrylic acids, and combinations thereof. In other embodiments, the thickening agent is a high molecular weight, cross-linked polyacrylic acid such as is commercially available under the Solthix™ tradename by Lubrizol Corporation of Wickliffe Ohio.

In one embodiment, the thickening agent is present and is a cross-linked polyacrylic acid. In another embodiment, the thickening agent is present in an amount of from about 1 to about 3 weight percent actives based on a total weight of the composition. In a further embodiment, the thickening agent is present and is chosen from modified cellulosics, modified polyacrylates, cross-linked polyacrylic acids, and combinations thereof. Alternatively, the thickening agent is present and is a cross-linked polyacrylic acid.

In still further embodiments, the linear alkylbenzene sulfonate present in an amount of from about 10 to about 20 weight percent actives based on a total weight of the composition, the defoamer is present in an amount of from about 5 to about 15 weight percent actives based on a total weight of the composition, and the thickening agent is present in an amount of from about 1 to about 3 weight percent actives based on a total weight of the composition. In various non-limiting embodiments, all values and ranges of values including and between those set forth above are hereby expressly contemplated for use herein.

Water

The composition also includes a balance of water. The water may be included in an amount such that the total weight percent actives of the composition is 100 parts or 100 weight percent actives. The water itself is not particularly limited and may include tap water, deionized water, distilled water, etc. The water of the composition is may be the same or different than the water utilized in the aqueous system that was first introduced above and is described in greater detail below.

Additional Components

The composition may include one or more additional components, or be free of one or more additional components, as chosen by one of skill in the art. For example, the one or more additional components may be a biocide, a preservative, a base such as NaOH or KOH, and combinations thereof. These one or more components may be utilized in any amounts known in the art.

Physical Properties

The composition is not particularly limited to any set of physical properties. However, in various embodiments, the composition has a viscosity of from about 300 to about 900, about 350 to about 850, about 400 to about 800, about 450 to about 750, about 500 to about 700, about 550 to about 650, about 550 to about 600, about 570 to about 630, about 570 to about 590, about 620 to about 640, etc., cps measured at about 25° C. using a Brookfield viscometer and method P6-1. In other embodiments, the composition has a pH of about 5 to about 7.5, about 5.5 to about 7, about 6 to about 6.5, measured at about 25° C. In still other embodiments, the composition has a specific gravity of from about 1 to about 1.05, e.g. about 1.003 to about 1.045 or about 1.024. In various non-limiting embodiments, all values and ranges of values including and between those set forth above are hereby expressly contemplated for use herein.

Additional Embodiments

In additional embodiments, the composition (Comp.) is as set forth below wherein all amounts are approximated:

| | Comp. 1 | Comp. 2 | Comp. 3 | Comp. 4 | Comp. 5 |
|---|---|---|---|---|---|
| Surfactant | 35 to 45 g | 30 to 40 g | 35 to 40 g | 30 to 45 g | 35 to 45 g |
| Defoamer | 40 to 60 g | 50 to 60 g | 45 to 55 g | 50 to 55 g | 50 to 60 g |
| Thickening Agent | 1 to 10 g | 5 to 10 g | 4 to 8 g | 1 to 5 g | 1 to 8 g |
| Water | 1 to 15 g | 5 to 10 g | 5 to 10 g | 5 to 15 g | 1 to 10 g |

In various non-limiting embodiments, all values and ranges of values including and between those set forth above are hereby expressly contemplated for use herein.

In various embodiments, the surfactant is Bio-Soft D-40 surfactant which is Sodium (C10-16) benzenesulfonate CAS 68081-81-2, ~40% actives. In other embodiments, the Defoamer is Drewplus FG-720/LANOFOAM B-20SK defoamer which is CAS 67762-90-7 and is Dimethyl siloxane, reaction product with silica, ~20% actives. In other embodiments, the Thickening Agent is Solthix A200 which is an acrylic polymer, ~30% actives. However, the aforementioned compositions are not limited to these particular compounds.

In other embodiments, the composition (Comp.) is as set forth below wherein all amounts are approximated:

|  | Comp. 6 | Comp. 7 | Comp. 8 | Comp. 9 | Comp. 10 |
| --- | --- | --- | --- | --- | --- |
| Surfactant | 10 to 40 g | 10 to 15 g | 35 to 40 g | 13 to 15 g | 36 to 38 g |
| Defoamer | 2 to 15 g | 5 to 15 g | 10 to 15 g | 8 to 10 g | 7 to 8 g |
| Thickening Agent | 0.5 to 5 | 0.5 to 1.5 g | 1 to 3 g | 5 to 6 g | 1 to 2 g |
| KOH | 1 to 10 g | 5 to 10 g | 1 to 3 g | 6 to 7 g | 1.5 to 2 g |
| Water | 50 to 75 g | 50 to 75 g | 50 to 75 g | 60 to 65 g | 50 to 55 g |

In various non-limiting embodiments, all values and ranges of values including and between those set forth above are hereby expressly contemplated for use herein.

In various embodiments, the surfactant is Marlon AS 3, which is dodecylbenzene sulfonic acid. KOH may be added thereto. Alternatively, or additionally, the surfactant may be Bio-Soft D-40, which is sodium dodecylbenzene sulfonate. Moreover, the thickening agent may be Carbopol 674 and/or Solthix A200, which is a crosslinked polyacrylic acid polymer. The Defoamer may include one or more of Brij S2 and/or Brij S20 which are each polyoxyethylene fatty ethers. The Defoamer may alternatively or additional include ACP-3073 which is a reaction product of dimethyl siloxane reaction with silica. However, the aforementioned compositions are not limited to these particular compounds.

Method of Forming the Composition

This disclosure also provides a method of forming the composition. The method includes the step of combining the alkyl aryl sulfonate and the defoamer, and optionally the thickening agent. These components may be combined in any order and either piecemeal or in their entireties. All combinations of components are hereby expressly contemplated in various non-limiting embodiments.

Method for Inhibiting Microbial Adhesion

This disclosure also provides a method for inhibiting microbial adhesion on surfaces in contact with water in an aqueous system. This method includes the step of providing the aforementioned composition and the step of combining the composition and water in the aqueous system. Alternatively, the method may be described as a method for dispersing and/or inhibiting the microbial colonization of surfaces in contact with an aqueous system, e.g., a cooling water, pulping or papermaking system, which comprises adding to the aqueous system a low-foaming composition containing an effective amount of the surfactant.

The step of providing may be as is understood in the art. The composition may be formed before or during use in this method. Typically, the composition is formed prior to use in this method.

The method also includes the step of combining the composition and water in the aqueous system. The water in the aqueous system is typically river water, municipal water, or any other water source that may be typically used, as would be understood by those of skill in the art. Moreover, the aqueous system may be any known in the art. In various embodiments, the aqueous system is a cooling tower, a heat exchanger, an air washers, or a pulp and paper manufacturing system. The aqueous system may alternatively have one or more surfaces that contact the water, as was first introduced above. These surfaces may be any surface of any one or more of the aforementioned aqueous systems. The composition is designed to inhibit microbial adhesion on these surfaces.

The composition may be combined with the water in any amount, as is chosen by one of skill in the art. In various embodiments, the composition is combined with the water in an amount of from about 1 to about 40, about 5 to about 35, about 10 to about 30, about 15 to about 25, about 20 to about 25, about 5 to about 15, about 10 to about 15, about 10 to about 20, about 5 to about 20, about 5 to about 10, etc. mg of actives of the alkyl aryl sulfonate, e.g. the linear alkylbenzene sulfonate, per about 1 liter of water in the aqueous system. This amount may alternatively be described as parts by weight of the alkyl aryl sulfonate per one million parts by weight of the water in the aqueous system (i.e., ppm of the alkyl aryl sulfonate in the water of the aqueous system). Moreover, the composition may be combined with the water and left in contact with the water for any amount of time, at any temperature, and at any pressure, as would be chosen by one of skill in the art. For example, the time, temperature, and pressure may depend on the particular location of the water in the aqueous system, the type of surfaces, the type of application, the microbial load of the water, etc. In other words, the application parameters may be varied by one of skill in the art to maximize the efficiency and effectiveness of the composition. In various non-limiting embodiments, all values and ranges of values including and between those set forth above are hereby expressly contemplated for use herein.

EXAMPLES

Example 1

A composition of the present disclosure was prepared by mixing together sodium dodecylbenzene sulfonate LAS (37.50 g Bio-Soft® D-40), an aqueous based hydrophobic silica containing defoamer (50.00 g, Solenis Drewplus™ FG720), and DI Water (12.50). The resulting formulation was an aqueous emulsion with a pH 6.3 and viscosity of 580 cps.

Example 2

A composition of the present disclosure was prepared as noted in Example 1 but included a thickener (4.17 g, Lubrizol Solthix™ A200) such that the DI Water charge was reduced accordingly (8.33 g). The resulting formulation was an aqueous emulsion with a pH 6.4 and viscosity of 600 cps.

Example 3

The stability of the compositions of Examples 1 and 2 were evaluated by observing aliquots stored at various temperatures for separation. The composition of Example 1 was evaluated and found to start to exhibit separation after 2 days at 25° C. Example 2, containing the thickener, was evaluated and found to be stable at temperatures ranging from about 4° C. to about 45° C. for upwards of 6-weeks (end of evaluation period). The sample of Example 1 that exhibited separation was easily reconstituted with mixing.

Example 4

The foaming potential of the compositions of Examples 1 and 2 were evaluated relative to sodium dodecylbenzene sulfonate (Bio-Soft® D-40) on an equal active LAS basis (30 ppm). The test were conducted by adding 100 mL of the test solution to a capped 250 mL graduated cylinder. The cylinder is shaken in an up and down motion for 40 inversions and then the volume of the foam was measured at 0, 1 and 3 minutes. The results, summarized in Table 1, indicate that compositions of the disclosure comprising a defoamer have a significantly reduced foaming potential.

TABLE 1

| Time (min) | Biosoft D-40 | Example 1 | Example 2 |
|---|---|---|---|
| 0 | 140 | 110 | 110 |
| 1 | 137 | 104 | 103 |
| 3 | 136 | 104 | 103 |

Example 5

Biofilms were grown on stainless steel 316 coupons in a CDC Biofilm reactor using M9YG minimal salts growth media for a period of twenty-four hours. Various concentrations of Example 2 and sodium dodecylbenzene sulfonate (Bio-Soft® D-40) on an equal active LAS basis (40 and 100 ppm) were added to the wells of a 12-well cell culture plate. A control was done with M9YG media. After the biofilms were grown, each coupon from the rods in the CDC reactor was unscrewed and dropped into a well of the plate. The plate was then incubated for two hours at 28° C. with shaking. Following the incubation, the coupons were removed from the wells and placed into 5 mL of phosphate-buffered saline (PBS) and sonicated for six minutes. Viable cells released into the fluid were then determined by a plating method. The results are recorded as the percent reduction in cell counts relative to the control.

TABLE 2

| LAS (ppm actives) | Biosoft D-40 | Example 2 |
|---|---|---|
| 40 | 41.83% | 62.81% |
| 100 | 81.58% | 96.28% |

While the present disclosure has been described with respect to particular embodiments thereof, it is apparent that numerous other forms and modifications will be obvious to those skilled in the art. The appended claims and this disclosure generally should be construed to cover all such obvious forms and modifications, which are within the true scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims. Moreover, all combinations of the aforementioned components, compositions, method steps, formulation steps, etc. are hereby expressly contemplated for use herein in various non-limiting embodiments even if such combinations are not expressly described in the same or similar paragraphs.

What is claimed is:

1. A composition for inhibiting microbial adhesion on surfaces, said composition being free of foam and comprising:
   a surfactant that is a linear alkylbenzene sulfonate, an acid thereof, or a combination thereof and that is present in an amount of from about 5 to about 30 weight percent actives based on a total weight of the composition and has the structure:

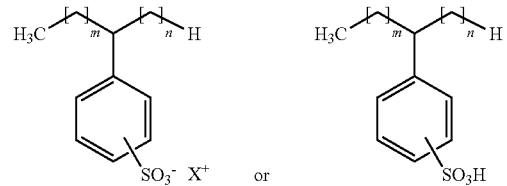

wherein each m is independently a number of from 0 to 10, each n is independently a number of from 0 to 10, the sum of each m+n is a number of from 8 to 10, and X is $Na^+$ or $K^+$;
   a defoamer that is an aqueous hydrophobic silica and is present in an amount of from about 5 to about 15 weight percent actives based on a total weight of the composition;
   a thickening agent present in an amount of from about 1.25 to about 3 weight percent actives based on a total weight of the composition; and
   water.

2. The composition of claim 1 wherein the surfactant is sodium dodecylbenzene sulfonate.

3. The composition of claim 1 wherein the thickening agent is a cross-linked polyacrylic acid.

4. The composition of claim 1 wherein the surfactant is present in an amount of from about 10 to about 20 weight percent actives based on a total weight of the composition.

5. The composition of claim 1 wherein the surfactant is present in an amount of from about 14 to about 16 weight percent actives based on a total weight of the composition, the defoamer is present in an amount of from about 8 to about 12 weight percent actives based on a total weight of the composition, and the thickening agent is present in an amount of from about 1 to about 1.5 weight percent actives based on a total weight of the composition.

6. The composition of claim 1 wherein the thickening agent is chosen from modified cellulosics, modified polyacrylates, cross-linked polyacrylic acids, and combinations thereof.

7. The composition of claim 1 wherein the thickening agent is a cross-linked polyacrylic acid.

8. A composition for inhibiting microbial adhesion on surfaces, said composition being free of foam and comprising:
   sodium dodecylbenzene sulfonate present in an amount of from about 5 to about 15 weight percent actives based on a total weight of the composition;
   an emulsion comprising hydrophobic silica that is present in an amount of from about 5 to about 15 weight percent actives based on a total weight of the composition;
   cross-linked polyacrylic acid present in an amount of from about 1.25 to about 3 weight percent actives based on a total weight of the composition; and
   water.

9. A method for inhibiting microbial adhesion on surfaces in contact with water in an aqueous system, said method comprising the steps of:
providing a composition that is free of foam; and
combining the composition and the water in the aqueous system to inhibit microbial adhesion on surfaces present in the aqueous system, wherein the composition comprises;
a surfactant that is a linear alkylbenzene sulfonate, an acid thereof, or a combination thereof and that is present in an amount of from about 5 to about 30 weight percent actives based on a total weight of the composition and has the structure:

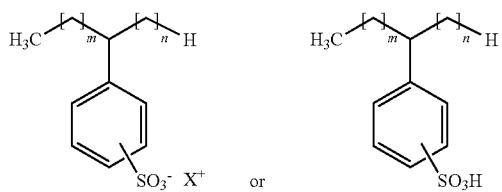

wherein each m is independently a number of from 0 to 10, each n is independently a number of from 0 to 10, the sum of each m+n is a number of from 8 to 10, and X is $Na^+$ or $K^+$,
a defoamer that is an aqueous hydrophobic silica and is present in an amount of from about 5 to about 15 weight percent actives based on a total weight of the composition,
a thickening agent present in an amount of from about 1.25 to about 3 weight percent actives based on a total weight of the composition, and
water.

10. The method of claim 9 wherein the step of combining is further defined as combining about 1 to about 40 mg of actives of the surfactant per about 1 liter of water in the aqueous system.

11. The method of claim 9 wherein the step of combining is further defined as combining about 5 to about 15 mg of actives of the surfactant per about 1 liter of water in the aqueous system.

12. The method of claim 9 wherein the aqueous system is a cooling tower.

13. The method of claim 9 wherein the aqueous system is a pulp and paper manufacturing system.

14. The composition of claim 1 consisting essentially of the surfactant, the defoamer, the thickening agent, and the water.

15. The composition of claim 1 consisting of the surfactant, the defoamer, the thickening agent, and the water.

16. The composition of claim 8 consisting essentially of:
the sodium dodecylbenzene sulfonate present in an amount of from about 5 to about 15 weight percent actives based on a total weight of the composition;
the emulsion comprising hydrophobic silica that is present in an amount of from about 5 to about 15 weight percent actives based on a total weight of the composition;
the cross-linked polyacrylic acid present in an amount of from about 1.25 to about 3 weight percent actives based on a total weight of the composition; and
the water.

17. The composition of claim 8 consisting essentially of:
the sodium dodecylbenzene sulfonate present in an amount of about 15 weight percent actives based on a total weight of the composition;
the emulsion comprising the hydrophobic silica that is present in an amount of about 10 weight percent actives based on a total weight of the composition;
the cross-linked polyacrylic acid present in an amount of about 1.25 weight percent actives based on a total weight of the composition; and
the water.

18. The composition of claim 8 consisting of:
the sodium dodecylbenzene sulfonate present in an amount of from about 5 to about 15 weight percent actives based on a total weight of the composition;
the emulsion comprising hydrophobic silica that is present in an amount of from about 5 to about 15 weight percent actives based on a total weight of the composition;
the cross-linked polyacrylic acid present in an amount of from about 1.25 to about 3 weight percent actives based on a total weight of the composition; and
the water.

19. The composition of claim 8 consisting of:
the sodium dodecylbenzene sulfonate present in an amount of about 15 weight percent actives based on a total weight of the composition;
the emulsion comprising the hydrophobic silica that is present in an amount of about 10 weight percent actives based on a total weight of the composition;
the cross-linked polyacrylic acid present in an amount of about 1.25 weight percent actives based on a total weight of the composition; and
the water.

20. The composition of claim 5 consisting of the surfactant present in an amount of from about 14 to about 16 weight percent actives based on a total weight of the composition, the defoamer present in an amount of from about 8 to about 12 weight percent actives based on a total weight of the composition, and the thickening agent present in an amount of from about 1 to about 1.5 weight percent actives based on a total weight of the composition.

* * * * *